Figure 1:
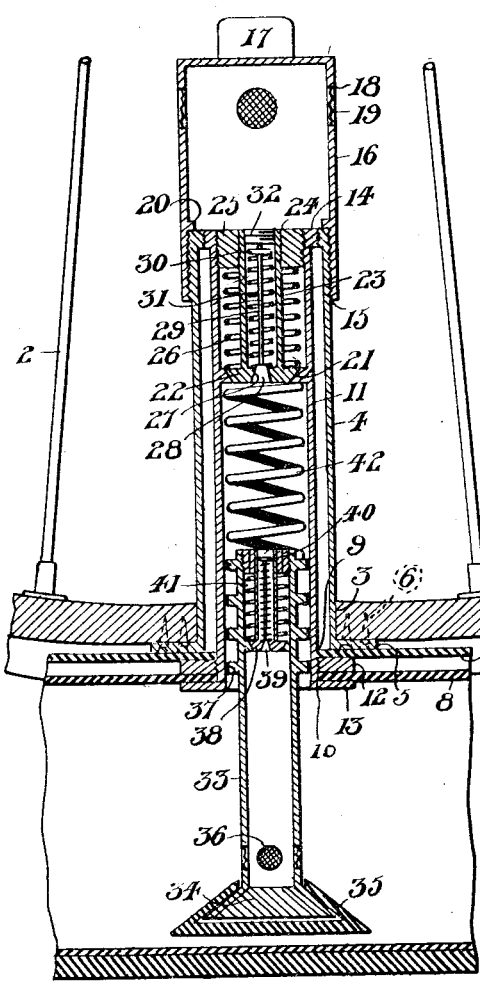

A. BREST.
AUTOMATIC TIRE PUMP.
APPLICATION FILED DEC. 26, 1911.

1,029,340.

Patented June 11, 1912.

WITNESSES

INVENTOR
Albert Brest
BY
ATTORNEYS

UNITED STATES PATENT OFFICE.

ALBERT BREST, OF NEW CASTLE, PENNSYLVANIA.

AUTOMATIC TIRE-PUMP.

1,029,340.   Specification of Letters Patent.   Patented June 11, 1912.

Application filed December 26, 1911. Serial No. 667,857.

*To all whom it may concern:*

Be it known that I, ALBERT BREST, a citizen of the United States of America, residing at New Castle, in the county of Lawrence and State of Pennsylvania, have invented certain new and useful Improvements in Automatic Tire-Pumps, of which the following is a specification, reference being had therein to the accompanying drawing.

This invention relates to an automatic tire pump, and the primary object of my invention is to furnish the rim of a wheel with a pump for automatically inflating a pneumatic tire carried by the rim of a wheel, the pump being arranged and constructed whereby normal pressure of air will be maintained in the inner tube of the tire and the tire prevented from bursting due to an excessive pressure upon the same, provision being made for the escape of air from the inner tube of the tire when the tire is unduly depressed.

A further object of this invention is to provide a pump that can be advantageously used in connection with automobile wheels, particularly the wheels of racing cars, where considerable trouble has been experienced in connection with the tires bursting due to the expansion and contraction of air within the inner tube. The top is constructed whereby greater supplies of air can be taken into the inner tube to maintain a normal temperature within the tube.

With the above and other objects in view, the invention resides in the novel construction, combination and arrangement of parts to be hereinafter specifically described and then claimed.

Reference will now be had to the drawings wherein there is illustrated the preferred embodiment of the invention, but it is to be understood that the structural elements are susceptible to such changes as fall within the scope of the appended claim.

In the drawings like numerals denote corresponding parts throughout the views, in which—

Figure 2:
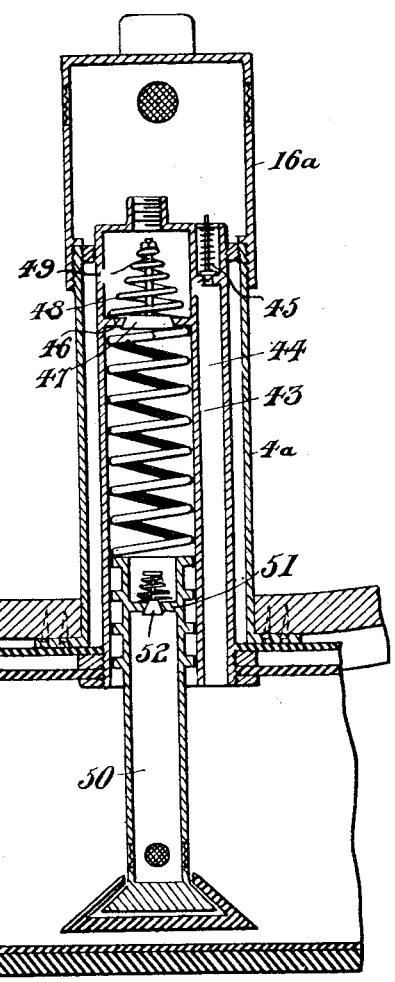

Figure 1 is a vertical sectional view of a portion of a wheel and tire illustrating the pump in connection therewith, and Fig. 2 is a similar view of a modified form of pump.

The reference numeral 1 denotes a portion of the rim of a wheel supported by spokes 2 and said rim has an opening 3 to accommodate the cylinder 4 of the pump. The outer end of the cylinder has a peripheral flange 5 that is secured to the rim 1 by screws 6 or other fastening means.

The reference numeral 7 denotes the outer tube of a tire and arranged within the outer tube is an inner pneumatic tube 8. The tubes 7 and 8 are provided with openings 9 and 10 respectively and through which extends the outer end of a cylindrical casing 11 which is located within the cylinder 4. The said outer end of the casing 11 is exteriorly screw threaded to receive a spacing nut 12 and a retaining nut 13, these nuts holding the outer end of the casing 11 in engagement with the tubes 7 and 8. The outer end of the casing 11 is in communication with the inner tube 8 and the inner end of the casing 11 is interiorly screw-threaded and provided with a collar 14, said collar being exteriorly screw-threaded. The collar 14 is screwed into the inner end of the cylinder 4, the latter being exteriorly screw-threaded, as at 15, to receive the outer end of a cap 16, said cap having a handle 17 whereby it can be conveniently connected to the end of the cylinder 4. The cap 16 has a plurality of openings 18 in the side walls thereof and these openings are screened or provided with woven wire covers 19, whereby when air is taken into the cap 16 foreign matter, as dust and dirt, will be prevented from entering said cap. The cap 16 is provided with inwardly projecting lugs 20, said lugs engaging the end of the cylinder 4 and limiting the movement of said cap upon the cylinder.

The reference numeral 21 denotes a horizontal partition within the casing 11, adjacent to the inner end of said casing, said partition having an opening forming a valve seat for a valve 22 that opens toward the inner end of the casing. The valve 22 is provided with a tubular stem 23 that extends into an opening 24 formed in a plug 25 that is screwed in the inner end of the casing 11. Encircling the tubular valve stem 23 is a coiled compression spring 26 said spring engaging the plug 25 and the valve 22 to retain the valve 22 normally seated in the partition 21 of the casing 11. The space between the partition 21 and the plug 25 serves as an auxiliary air reservoir to which air is admitted when the valve 22 is open.

The valve 22 is provided with a central tapering opening 27 serving as a seat for a tapering valve 28, said valve having a rod 29 extending longitudinally of the tubular valve stem 23. The rod 29 terminates at a point removed from the inner end of the tubular valve stem 23 and is provided with a head 30. Encircling the rod 29, between the head 30 and the valve 22 is a coiled retractile spring 31 that retains the valve 28 normally closed. The end of the tubular valve stem 23 is interiorly screw-threaded, as at 32, whereby an air supply hose or tube can be connected to the stem 23 for forcing air into the casing 11, the valve 28 unseating due to the pressure of air within the stem 23. An ordinary hand-pump can be connected with the stem 23 by removing the cap 16.

The reference numeral 33 denotes a tubular piston rod extending into the outer end of the casing 11 and into the inner tube 8, said piston rod having a conical-shaped head 34 covered by a shoe 35, preferably made of rubber or other yieldable material, whereby the end of said tubular piston rod cannot injure the inner tube 8. The tubular piston rod 33, adjacent the head 34 has screened openings 36, and the outer end of the piston rod is provided with a plurality of circumferentially arranged packing rings 37 engaging the walls of the casing 11. Arranged within the outer end of the tubular piston rod 33 is a spring-pressed valve 38, a spring-seated valve 39, and a tubular valve-stem 40, these elements being similar to the elements 22, 28 and 23 previously described in connection with the inner end of the casing 11.

It is thought that the construction and operation of the modified form of pump shown in Fig. 2 will be better understood after the operation of the pump as shown in Fig. 1 is described.

When the car is first placed in commission, the cap 16 is removed and an air supply hose connected to the ends of the tubular valve stem 23. Air is forced into the stem 23, unseating the valve 28. The air passes into the stem 40 and unseats the valve 29, the air passing through the tubular piston rod 33 and escaping through the opening 36 into the inner tube 8 of the tire. Immediately upon the inner tube 8 being inflated and a supply of air shut off, the valves 28 and 39 are seated by the retractile springs encircling the rods of said valves. When the tire is depressed, air within the tire is forced into the tubular piston rod 33, unseating the valve 38 and the air enters the auxiliary air reservoir 41 in the outer end of the tubular piston rod 33. A depression of the tire also shifts the tubular piston rod 33 by reason of the tire engaging the shoe 35. As the piston rod moves in the casing 11, the valve 22 is unseated and the air within the casing 11 passes into the auxiliary air reservoir between the partition 21 and the plug 25. When the tire assumes its normal condition, the tubular piston rod 33 is restored to its normal position by a coiled compression spring 42 located within the casing 11 between the partition 21 and the end of the tubular piston rod 33. This movement of the tubular piston rod causes the valve 28 to unseat and a quantity of air is drawn into the casing 11. Another depression of the tire and a movement of the tubular piston rod 33 within the casing 11, causes the valve 39 to unseat and admit air from the casing 11 into the tire, providing, the casing 11 is filled with air and the valve 22 is prevented from unseating by the valve 39 opening in advance of the valve 22. This advance operation of the valve 39 with respect to the valve 22 is accomplished by reason of the valve 39 being of a less diameter than the valve 22, and the spring associated with the valve 39 of less tension than the spring associated with the valve 22.

Reference will now be had to Fig. 2 of the drawings, wherein it will be observed that the cylinder 4ª and the cap 16ª are used similar to the cylinder 4 and the cap 16 previously described. Located within the cylinder 4ª is a casing 43 having a by-path 44. The by-path 44 is in communication with the inner tube 8 and the opposite end of the by-path has an air outlet valve 45. The valve 45 is of the spring-pressed type that is normally closed, and said valve is opened to permit of an exhaust of air by an excessive depression upon the tire. The casing 43 has a horizontal partition 46 provided with a valve seat for a valve 47. This valve is retained normally in a closed position by a single volute-helix spring 48 encircling the valve stem 49 of said valve. Associated with the casing 43 is a hollow piston rod 50, similar to the piston rod 33 previously described, with the exception that the piston rod 50 has a partition 51 provided with a single valve 52, said valve being similar to the valve 47 but upon a smaller scale.

The operation of the modified form of pump is very similar to the preferred form with the exception that the air within the inner tube 8 escapes through the medium of the by-path 44 when there is an excessive pressure of air within the tire.

From the foregoing it will be observed that I have devised a tire pump wherein a series of valves are employed for controlling the inlet and exhaust of air to and from a tire. It is through the medium of the tubular or hollow piston rod of the pump that air is admitted to the tire for inflating, and while in the drawing there are illustrated the preferred embodiment of the invention, it is to be understood that the structural elements are susceptible to such variations and modifications as fall within the scope of the appended claim.

What I claim is:

In a tire pump, the combination with the rim of a wheel, and a pneumatic tire carried thereby, of a cylinder secured to the rim of said wheel, a cap detachably mounted upon the end of said cylinder, a casing located in said cylinder, a tubular piston rod arranged in said casing and extending into said tire and adapted to be actuated by a depression thereof, a pair of valves carried by said tubular piston rod at the inner end thereof for controlling the passage of air therethrough, and valves arranged within said casing at the inner end thereof for controlling the inlet and exhaust of air to and from said casing.

In testimony whereof I affix my signature in the presence of two witnesses.

ALBERT BREST.

Witnesses:
CHAS. B. MAYNE,
HORACE GEARY.